Nov. 6, 1962     R. J. ROMAN     3,062,064
DRIVE MECHANISM
Filed April 27, 1960     3 Sheets-Sheet 1
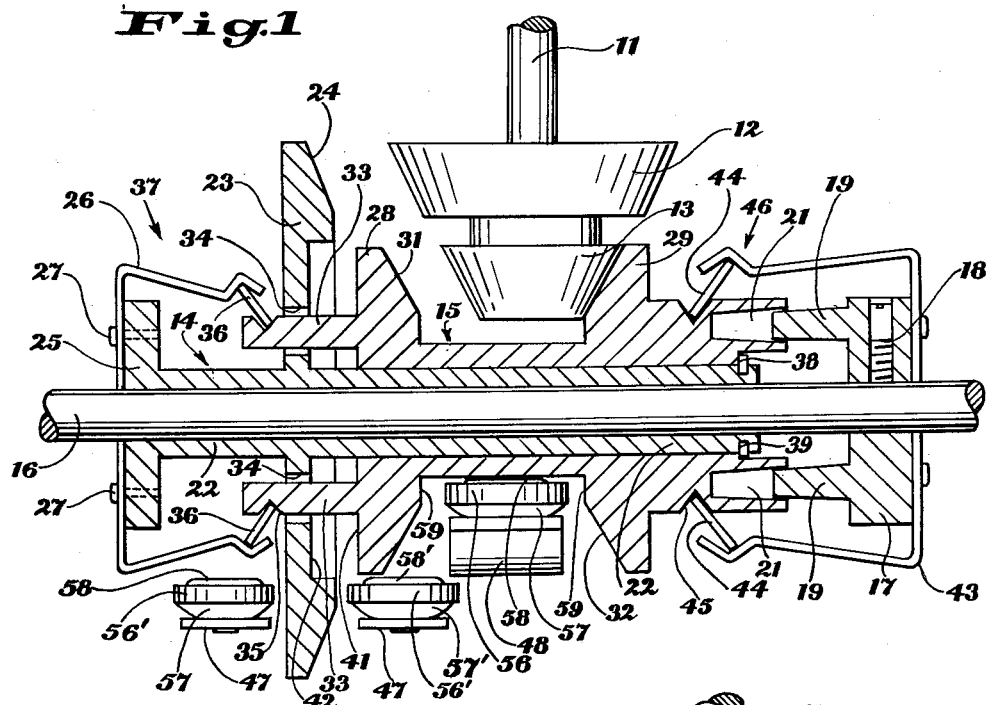
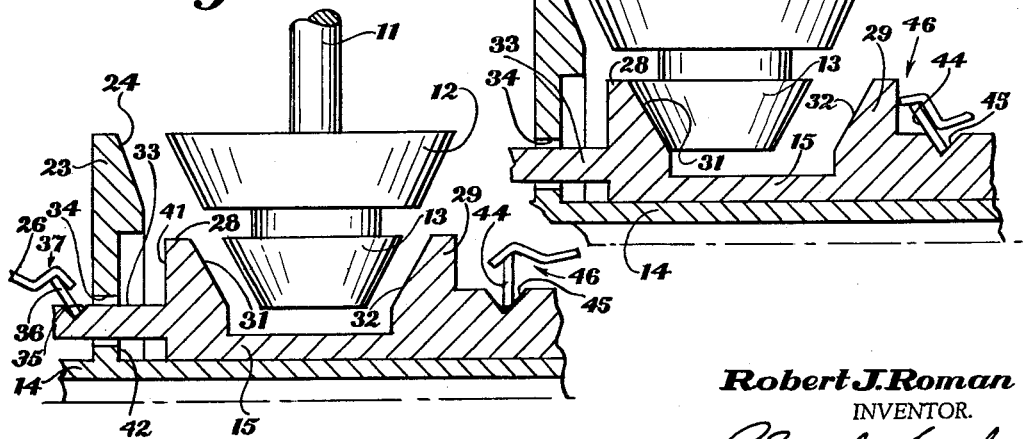
Robert J. Roman
INVENTOR.
BY R. Frank Smith
Steve W. Grambow
ATTORNEYS Nov. 6, 1962 R. J. ROMAN 3,062,064
DRIVE MECHANISM Filed April 27, 1960 3 Sheets-Sheet 2

Robert J. Roman
INVENTOR.

BY
ATTORNEYS

Nov. 6, 1962    R. J. ROMAN    3,062,064
DRIVE MECHANISM
Filed April 27, 1960    3 Sheets-Sheet 3

Robert J. Roman
INVENTOR.
BY R. Frank Smith
Steve W. Grenbow
ATTORNEYS

United States Patent Office 3,062,064
Patented Nov. 6, 1962

3,062,064
DRIVE MECHANISM
Robert J. Roman, Rochester, N.Y., assignor to Eastman Kodak Company, Rochester, N.Y., a corporation of New Jersey
Filed Apr. 27, 1960, Ser. No. 25,093
20 Claims. (Cl. 74—202)

This invention relates generally to drive mechanisms, and more specifically to a drive mechanism for a projector and the like for obtaining two forward speeds and a single reverse speed.

The principal object of the present invention is to provide a drive mechanism for a projector or the like that is of simple design and construction, thoroughly reliable and efficient in operation, and economical to manufacture.

A more specific object of the invention is the provision of an improved variable speed drive mechanism for a projector or the like in which a pair of relatively movable driven elements are selectively movable toward one another into an engaged position, or apart from one another into a separated position by a first overcenter spring system, and a second overcenter spring system of lesser force than the first spring system urges the driven elements as a unit into engagement with a drive member.

Objects and advantages other than those set forth above will be apparent from the following description when read in connection with the accompanying drawings, in which:

FIG. 1 is a side elevation view partially in section of a preferred embodiment of the present invention showing the drive mechanism in a reverse drive position;

FIG. 2 is a segmental view of a portion of the drive mechanism of FIG. 1 showing the position assumed by the drive cone pulleys and the driven elements when the drive mechanism is in a neutral position;

FIG. 3 is a view similar to FIG. 2 showing the position of the drive cone pulleys and driven elements when the drive mechanism is in one forward speed position;

Figure 4:
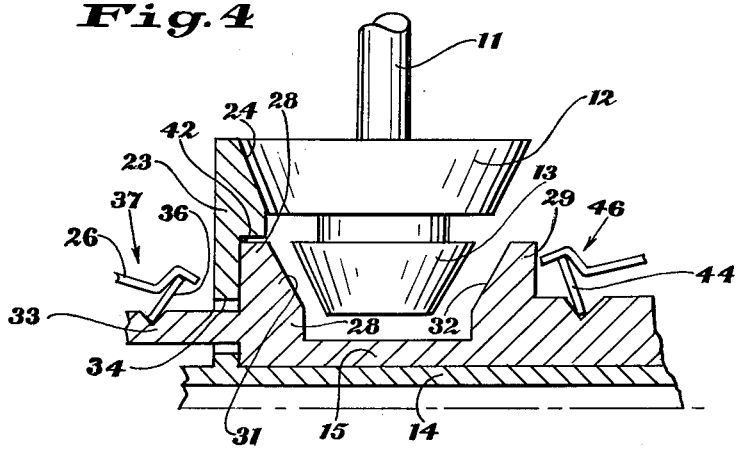
FIG. 4 is a view similar to FIG. 2 showing the position assumed by the drive cone pulleys and driven elements when the drive mechanism is in another forward speed position.

The drive mechanism shown in the drawings is particularly adaptable to a movie projector, although it may be used to drive any type of mechanism where a neutral position, a single speed reverse drive position, and two forward speed drive positions are desired. For projector operation in which the drive mechanism is coupled to the sprockets and pull-down mechanism for advancing the film through the projector, the two forward film speeds obtainable are 18 frames per second and 24 frames per second. The film speed in the reverse drive position is 24 frames per second.

As shown in FIG. 1 of the drawing, the projector, or the like, in which the drive mechanism is embodied is provided with a fixed drive shaft 11 having a pair of axially spaced drive cone pulleys 12, 13 of different size secured to one end thereof. The drive shaft 11 and drive cone pulleys 12, 13 are constantly rotated by any suitable drive motor, not shown, when the drive motor is connected to a suitable power supply.

The driven mechanism essentially comprises a driven element 14 and a driven member 15 carried by element 14. The driven mechanism is loosely mounted on a driven shaft 16 transverse to drive shaft 11, and which in the case of a projector drives the shutter, sprocket and pull-down mechanisms, not shown. The driven mechanism is secured to driven shaft 16 by a cylindrical drive block 17 secured to shaft 15 by a set screw 18. The drive block 17 further has a pair of axially extending fingers 19 extending into complementary openings 21 provided by driven member 15 for coupling member 15 to drive block 17 and shaft 16 so that rotation of member 15 causes a corresponding rotation of drive block 17 and shaft 16. The driven element 14 has a cylindrical hub 22 loosely encircling shaft 16, and a circular disk 23 integrally formed therewith having a beveled face 24 complementary to the drive surface of drive cone pulley 12. The cylindrical hub 22 has a circular flange 25 at one end for supporting a U-shaped spring element 26 which is secured thereto by rivets 27 or the like.

The driven member 15 is loosely mounted on hub 22, and has axially spaced apart circular flanges, 28, 29 having beveled surfaces 31, 32 respectively complementary to and adapted to cooperate with diametrically opposed surfaces of drive pulley 13. The flange 28 has a pair of axially extending arms 33 extending through complementary slots 34 provided by disk 23. Each arm 33 has an elongated V-shaped slot 35, and a toggle plate 36 is interposed between each arm 33 and one of the ends of spring 26 with one edge thereof bottoming in slot 35 and the opposite edge being held in a valley formed by the ends of spring 26. The toggle plates 36 in combination with spring 26 form an overcenter spring toggle system 37 for holding driven element 14 and member 15 relative to one another in one of two positions. With the overcenter spring toggle system 37 in the position shown in FIG. 1, driven element 14 and member 15 are axially moved apart or separated urging an annular shoulder 38 of member 15 into engagement with a retaining ring 39 secured to the opposite end of hub 22. Element 14 and member 15 are maintained in this separated position as a unit. When overcenter spring toggle system 37 is in the position shown in FIG. 4, driven element 14 and member 15 are axially moved together with a surface 41 of flange 28 engaging a surface 42 of disk 23 as best seen in FIG. 1, and held in this engaged position as a unit. The primary function of spring system 37 is to hold element 14 and member 15 as a unit in either the engaged or separated position. A U-shaped spring 43 similar to spring 26 is secured to drive block 17, and toggle plates 44 similar to toggle plates 36 are interposed between member 15 and the ends of spring 43 with one edge of each plate 44 thereof bottoming in a complementary V-shaped slot 45 in member 15 and the opposite edge bottoming in a valley formed by the end of spring 43 to form an overcenter spring toggle system 46 similar to system 37 previously described. The primary function of spring system 46 is to axially urge element 14 and member 15 as a unit, whether separated or engaged, into engagement with drive pulleys 12, 13. Although the overcenter spring toggle systems 37, 46 are similar, the force exerted by spring toggle system 37 is greater than the force exerted by spring toggle system 46 for a reason to be explained hereinafter.

Figure 5:
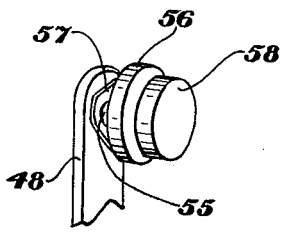
FIG. 5 is a fragmentary view in perspective showing one end of a shift lever.
Figure 6:
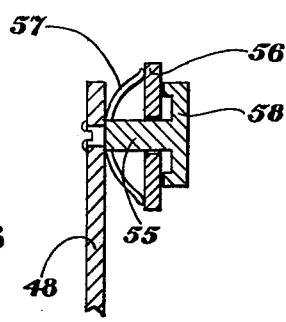
FIG. 6 is a sectional view of the structure of FIG. 5.
Figure 7:
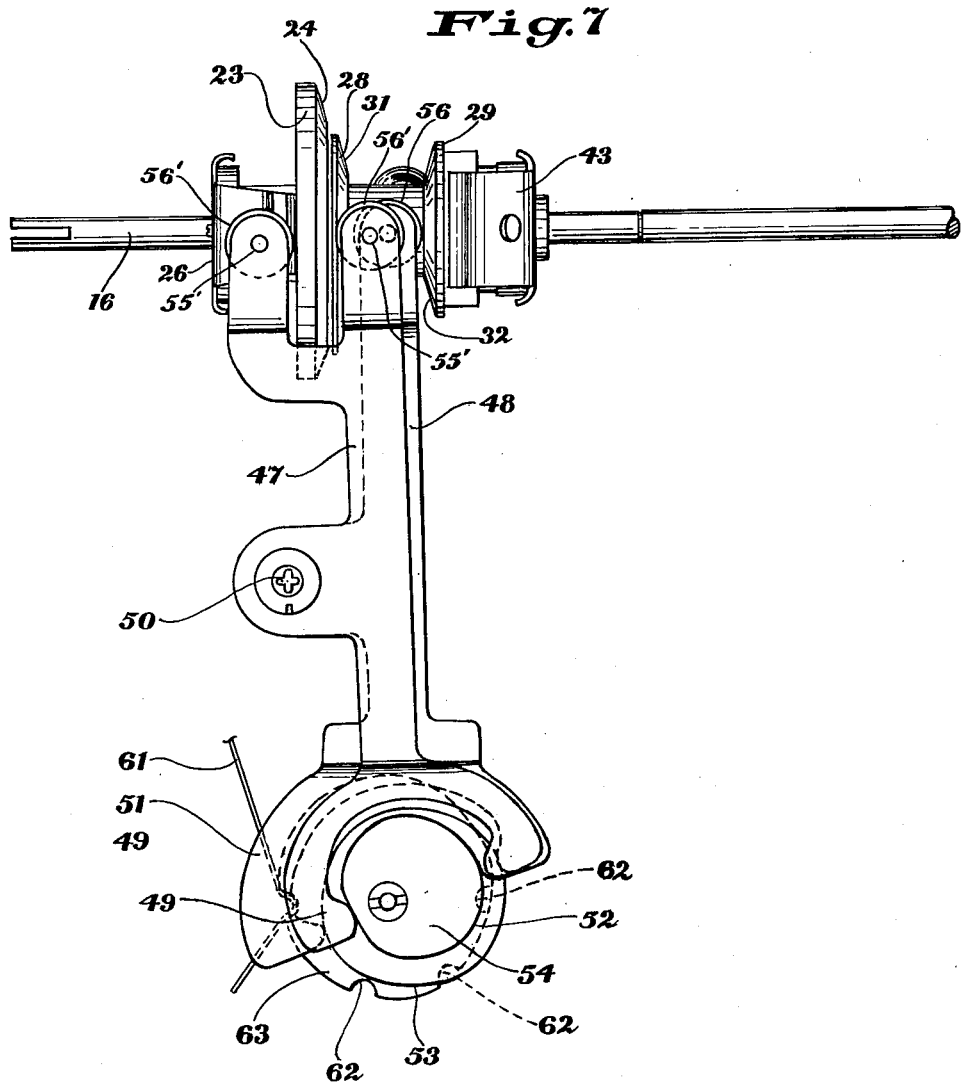
FIG. 7 is an elevation view of the drive mechanism of FIG. 1 looking at it from the bottom and showing the shifting mechanism.

The shifting mechanism for shifting the drive mechanism into neutral, reverse drive, and forward drive positions comprises a pair of shift levers 47, 48 having bifurcated ends 49, 51 respectively cooperating with and controlled by adjacent cam surfaces 52, 53 respectively provided by a cam member 54, as seen in FIG. 7. The opposite end of lever 48 has a stud 55 riveted thereto upon which a roller 56 is rotatably mounted as best seen in FIGS. 5 and 6. A spring 57 is interposed between lever 48 and a flange 58 of stud 55 for urging roller 56 against flange 58 for minimizing noise components due to chattering. The opposite end of lever 47 is forked and each leg thereof has a stud 55', roller 56', spring 57' and flange 58' similar to the aforementioned counterparts carried by lever 48. The lever 48 and its roller 56 is interposed between flanges 28 and 29 and is adapted to engage one of the inner surfaces 59 thereof. The lever 47 is mounted so that disk 23 is interposed between the forked end thereof with rollers 56' adapted to engage opposite sides of disk 23. A detent as seen in FIG. 7 including a spring 61 adapted to engage peripheral notches 62 in a disk 63 of cam member 54 is provided for releasably holding the drive mechanism in a selected neutral or drive position.

In the operation of this invention, let us assume initially that the shifting mechanism is moved by turning cam member 54 in a counterclockwise direction by means of a knob, not shown, actuating levers 47, 48 for placing the drive mechanism in the reverse drive position shown in FIG. 1. In this position overcenter spring system 37 holds element 14 and member 15 in a separated positon, and overcenter spring system 46 urges flange 29 into engagement with drive cone pulley 13 which drives element 14, member 15, drive block 17 and shaft 16 at a predetermined speed. In projector design, this predetermined speed is adapted to transport the filmstrip at the rate of 24 frames per second in a reverse direction. Moving the shifting mechanism by turning cam member 54 clockwise causes rollers 56' to engage disk 23 and axially urge element 14 and member 15 as a unit to the right until detent spring 61 drops into a notch 62 and holds the drive mechanism in the neutral position as shown in FIG. 2. In this neutral position, drive cone pulleys 12, 13 are both out of engagement with driven element 14 and member 15. Turning cam member 54 further clockwise moves the shifting and drive mechanisms from the neutral position to the first forward speed drive position shown in FIG. 3. In doing so, spring toggle system 46 is moved overcenter causing system 46 to axially urge element 14 and member 15 as a unit further to the right causing flange surface 31 to engage drive cone pulley 13 as seen in FIG. 3. Moving the shifting mechanism from the first forward speed drive position to the second forward speed drive position by turning cam member 54 still further in a clockwise direction causes roller 56' to urge disk 23 of element 14 still further to the right relative to member 15 which is held stationary by the engagement of flange surface 31 with drive cone pulley 13. As disk 23 and element 14 are moved to the right, the overcenter spring system 37 is moved past its deadcenter position axially urging element 14 and member 15 into their engaged position against the bias of spring system 46. Overcenter spring system 46 continues to urge element 14 and member 15 axially to the right as a unit as seen in FIG. 4 moving flange surface 24 into engagement with drive cone pulley 12. It is necessary that the axial force exerted by spring system 37 exceed the axial force exerted by spring system 46 in order to axially move element 14 and member 15 into their engaged position against the bias of spring system 46, in which position flange surface 31 is held out of engagement with drive cone pulley 13. If the reverse were true, in the forward speed drive position shown in FIG. 4, the overcenter spring toggle system 46 would axially move both flange surfaces 24, 31 into engagement with drive cone pulleys 12, 13 respectively which would result in an impossible situation.

As cam member 54 is turned back to its original position for moving the shifting mechanism from the second forward speed drive position of FIG. 4 back to the reverse drive position of FIG. 1, roller 56 engages surface 59 stopping axial movement of member 15 to the left. This is the primary function served by lever 48 and roller 56, although they may assist in axially moving element 14 and member 15. Further movement of cam member 54 into the first forward speed position moves element 14 to the left relative to member 15 which is held stationary by roller 56 engaging inner surface 59, moving spring toggle system 37 overcenter from its position shown in FIG. 4 to the over-center position shown in FIG. 1 axially moving element 14 and member 15 into their separated position. Continued movement of cam member 54 from the first forward position into the neutral position causes roller 56 to withdraw from surface 59 and one of the rollers 56' to axially urge element 14 and member 15 as a unit to the left moving spring system 46 to its dead center position shown in FIG. 2. Moving cam member 54 from the neutral position to the reverse position moves spring system 46 past its dead center position into the overcenter position of FIG. 1, urging flange surface 32 into engagement with drive cone pulley 13. The shifting mechanism is designed so that in the reverse and drive positions, detent spring 61 holds rollers 56, 56' out of engagement with disc 23 or surface 59.

The invention has been described in detail with particular reference to a preferred embodiment thereof, but it will be understood that variations and modifications can be effected within the spirit and scope of the invention as described hereinabove and as defined in the appended claims.

I claim:

1. In a variable speed drive mechanism for a projector and the like, the combination comprising: first driven means; second driven means, said first and second driven means being movable toward one another into a first position, and apart from one another into a second position; first resilient means for selectively holding said first and second driven means in one of said first and second positions; driving means; and second resilient means weaker than said first resilient means for selectively urging one of said first and second driven means into engagement with said driving means in each of said first and second positions.

2. The invention according to claim 1 wherein each of said first and second resilient means comprises an overcenter spring toggle system.

3. The invention according to claim 1 wherein said first and second driven means are axially movable with respect to one another into said first and second positions.

4. The invention according to claim 1 wherein said first and second driven means are axially movable with respect to one another into said first and second positions, and each of said first and second resilient means comprises an overcenter spring toggle system.

5. The invention according to claim 1 and including a driven shaft; and said first driven means comprises a cylindrical member mounted on said shaft and axially movable thereon; and said second driven means comprises a cylindrical element concentric with and drivingly connected to said driven shaft and mounted for axial movement on said cylindrical member.

6. The invention according to claim 5 wherein said cylindrical member has a circular disc, and said cylindrical element has a pair of axially spaced flanges, said disc and said flanges adapted to selectively engage said driving means.

7. The invention according to claim 6 wherein said driving means comprises a pair of axially spaced drive cone pulleys, one of which is adapted to drivingly engage said disc and the other adapted to drivingly engage one of said flanges upon axial movement of said first and second driven means.

8. The invention according to claim 6 wherein one of said flanges has a pair of axially extending arms, and said disc has complementary shaped openings through which said arms loosely extend.

9. The invention according to claim 1 and including a driven shaft; and said first driven means comprises a cylindrical member mounted on said shaft and axially movable thereon, said member further having a circular disc with an opening therein; said second driven means comprises a cylindrical element concentric with said driven shaft and mounted for axial movement on said cylindrical member, said cylindrical element further having a pair of axially spaced flanges, one of which has an axially extending arm extending through said opening, said invention further including connecting means for drivingly connecting said cylindrical element to said drive shaft; and said driving means comprises a pair of axially spaced drive cone pulleys, one of which is adapted to drivingly engage said disc in a first axial location of said first and second driven means, and the other adapted to selectively drivingly engage one of said flanges in a second axial location of said first and second driven means and the remaining flange in a third axial location of said first and second driven means.

10. The invention according to claim 9 wherein said connecting means comprises a block member secured to said driven shaft and having an axially extending finger slidably extending into a complementary opening in said cylindrical element.

11. The invention according to claim 1 and including a driven shaft; and said first driven means comprises a cylindrical member mounted on said shaft and axially movable thereon, said member further having a circular disc with an opening therein; said second driven means comprises a cylindrical element concentric with said driven shaft and mounted for axial movement on said cylindrical member, said cylindrical element further having a pair of axially spaced flanges, one of which has an axially extending arm extending through said opening, said invention further including a block member secured to said driven shaft and having an axially extending finger slidably extending into a complementary depression in said cylindrical element; said first and second resilient means comprise first and second overcenter spring toggle systems respectively; and said driving means comprises a pair of axially spaced drive cone pulleys, one of which is adapted to drivingly engage said disc in a first axial location of said first and second driven means, and the other adapted to selectively drivingly engage one of said flanges in a second axial location of said first and second driven means and the remaining flange in a third axial location of said first and second driven means.

12. The invention according to claim 11 wherein said first overcenter spring toggle system comprises a first spring secured to said cylindrical member, and a first toggle plate interposed between said first spring and said arm; and said second overcenter spring toggle system comprises a second spring secured to said block member and a second toggle plate interposed between said spring and said cylindrical element.

13. In a variable speed drive mechanism for a projector and the like, the combination comprising: first driven means; second driven means, said first and second driven means being axially movable toward one another into a first position, and apart from one another into a second position; first resilient means for selectively holding said first and second driven means in one of said first and second positions; driving means for selectively driving one of said first and second driven means; second resilient means weaker than said first resilient means for selectively urging one of said first and second driven means into engagement therewith in each of said first and second positions; and shifting means for moving said first and second driven means into one of a plurality of axial locations with respect to said driving means for obtaining different forward and reverse speeds.

14. The invention according to claim 13 wherein each of said first and second resilient means comprises an overcenter spring toggle system.

15. The invention according to claim 13 wherein said first and second driven means are axially movable with respect to one another into said first and second positions, and each of said first and second resilient means comprises an overcenter spring toggle system.

16. The invention according to claim 13 and including a driven shaft; and said first driven means comprises a cylindrical member mounted on said shaft and axially movable thereon; and said second driven means comprises a cylindrical element concentric with and drivingly connected to said driven shaft and mounted for axial movement on said cylindrical member.

17. The invention according to claim 16 wherein said cylindrical member has a circular disc, and said cylindrical element has a pair of axially spaced flanges, said disc and said flanges adapted to selectively engage said driving means.

18. The invention according to claim 13 and including a driven shaft; and said first driven means comprises a cylindrical member mounted on said shaft and axially movable thereon, said member further having a circular disc with an opening therein; said second driven means comprises a cylindrical element concentric with said driven shaft and mounted for axial movement on said cylindrical member, said cylindrical element further having a pair of axially spaced flanges, one of which has an axially extending arm extending through said opening, said invention further including connecting means for drivingly connecting said cylindrical element to said driven shaft; and said driving means comprises a pair of axially spaced drive cone pulleys, one of which is adapted to drivingly engage said disc in a first axial location of said first and second driven means, and the other adapted to selectively drivingly engage one of said flanges in a second axial location of said first and second driven means and the remaining flange in a third axial location of said first and second driven means.

19. The invention according to claim 13 and including a driven shaft; and said first driven means comprises a cylindrical member mounted on said shaft and axially movable thereon, said member further having a circular disc with an opening therein; said second driven means comprises a cylindrical element concentric with said driven shaft and mounted for axial movement on said cylindrical member, said cylindrical element further having a pair of axially spaced flanges, one of which has an axially extending arm extending through said opening, said invention further including a block member secured to said driven shaft and having an axially extending finger slidably extending into a complementary depression in said cylindrical element; said first and second resilient means comprise first and second overcenter spring toggle systems respectively; and said driving means comprises a pair of axially spaced drive cone pulleys, one of which is adapted to drivingly engage said disc in a first axial location of said first and second driven means, and the other adapted to selectively drivingly engage one of said flanges in a second axial location of said first and second driven means and the remaining flange in a third axial location of said first and second driven means.

20. The invention according to claim 19 wherein said first overcenter spring toggle system comprises a first spring secured to said cylindrical member, and a first toggle plate interposed between said first spring and said arm; and said second overcenter spring toggle system comprises a second spring secured to said block member and a second toggle plate interposed between said spring and said cylindrical element.

References Cited in the file of this patent

UNITED STATES PATENTS

| | | |
|---|---|---|
| 516,987 | Frisbie | Mar. 20, 1894 |
| 1,305,871 | Bohlmann | June 3, 1919 |
| 1,747,808 | Witkowski | Feb. 18, 1930 |